US012598448B2

(12) United States Patent (10) Patent No.: US 12,598,448 B2
Kato et al. (45) Date of Patent: Apr. 7, 2026

(54) TRANSITORY TANGIBLE COMPUTER-READABLE STORAGE MEDIUM

(71) Applicant: DENSO CORPORATION, Kariya (JP)

(72) Inventors: Hiroko Kato, Kariya (JP); Tadao Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 463 days.

(21) Appl. No.: 18/102,192

(22) Filed: Jan. 27, 2023

(65) Prior Publication Data

US 2023/0171573 A1     Jun. 1, 2023

Related U.S. Application Data

(63) Continuation of application No. PCT/JP2020/029320, filed on Jul. 30, 2020.

(51) Int. Cl.
*H04W 4/46*          (2018.01)
(52) U.S. Cl.
CPC ..................................... *H04W 4/46* (2018.02)
(58) Field of Classification Search
CPC ..... H04W 4/46; H04W 52/343; H04W 72/40; H04W 72/52; H04W 76/14; H04W 92/18; H04W 4/40; H04W 8/24; H04B 17/318; G08G 1/163; G08G 1/075
See application file for complete search history.

(56) References Cited

U.S. PATENT DOCUMENTS

| 8,346,684 B2 * | 1/2013 | Mirbach | ............. G06F 18/2414 |
| | | | 706/12 |
| 10,771,961 B2 * | 9/2020 | Lee | ........................ H04W 8/24 |
| 11,617,201 B2 * | 3/2023 | Bai | ....................... G08G 1/163 |
| | | | 370/231 |

(Continued)

FOREIGN PATENT DOCUMENTS

| CN | 110021175 A | * | 7/2019 | ............. G08G 1/065 |
| CN | 110503833 A | * | 11/2019 | ............. G08G 1/075 |

(Continued)

OTHER PUBLICATIONS

"Improving Information Age in SAE J2945 Congestion-Controlled Beaconing," Sungheon Lim et al., IEEE Communications Letters, vol. 23, No. 2, Feb. 2019 (Year: 2019).*

(Continued)

*Primary Examiner* — Ayaz R Sheikh
*Assistant Examiner* — Louis Samara
(74) *Attorney, Agent, or Firm* — Harness, Dickey & Pierce, P.L.C.

(57) ABSTRACT
A method performed by a communication apparatus according to an aspect of the present disclosure includes calculating (400, 530) a generation interval and transmit power of a basic safety message used for Vehicle-to-Vehicle, V2V, safety communication, based on a channel busy ratio which is a ratio of time during which a channel is busy and on vehicle density within a predetermined range, and transmitting (500), based on the generation interval and the transmit power, the basic safety message over a PC5 reference point specified in a technical specification of the 3rd Generation Partnership Project, 3GPP.

12 Claims, 5 Drawing Sheets

(56) References Cited

U.S. PATENT DOCUMENTS

| | | | | |
|---|---|---|---|---|
| 11,776,405 | B2 * | 10/2023 | Hwang | H04W 4/40 |
| | | | | 340/902 |
| 2013/0279392 | A1 * | 10/2013 | Rubin | H04W 4/12 |
| | | | | 370/312 |
| 2015/0287323 | A1 * | 10/2015 | Wells | G08G 1/166 |
| | | | | 701/29.3 |
| 2017/0053530 | A1 | 2/2017 | Gogic et al. | |
| 2018/0048572 | A1 | 2/2018 | Gulati et al. | |
| 2018/0048577 | A1 | 2/2018 | Gulati et al. | |
| 2018/0049084 | A1 | 2/2018 | Lee et al. | |
| 2018/0077654 | A1 | 3/2018 | Kulkarni et al. | |
| 2018/0261097 | A1 * | 9/2018 | Jiang | G08G 1/163 |
| 2019/0043360 | A1 | 2/2019 | Weinfield | |
| 2019/0096144 | A1 * | 3/2019 | Noh | H04W 12/66 |
| 2019/0182639 | A1 | 6/2019 | Basu Mallick et al. | |
| 2019/0261216 | A1 | 8/2019 | Lee et al. | |
| 2019/0349802 | A1 * | 11/2019 | Weinfield | H04W 4/021 |
| 2019/0394803 | A1 * | 12/2019 | Blasco Serrano | |
| | | | | H04W 28/0289 |
| 2020/0044971 | A1 | 2/2020 | Gulati et al. | |
| 2020/0118436 | A1 | 4/2020 | Gogic et al. | |
| 2021/0022035 | A1 | 1/2021 | Lee et al. | |
| 2021/0400509 | A1 * | 12/2021 | Lee | B60W 40/08 |
| 2023/0171573 | A1 * | 6/2023 | Kato | H04W 76/14 |
| | | | | 370/310 |

FOREIGN PATENT DOCUMENTS

| | | | | | |
|---|---|---|---|---|---|
| CN | 110691340 | A | * | 1/2020 | H04W 28/04 |
| CN | 111083672 | A | * | 4/2020 | H04B 17/318 |
| EP | 4436143 | A2 | * | 9/2024 | H04L 67/12 |
| EP | 3856595 | B1 | * | 12/2024 | G08G 1/166 |
| JP | 201846554 | A | | 3/2018 | |
| JP | 2018148332 | A | | 9/2018 | |
| JP | 2018530810 | A | | 10/2018 | |
| JP | 2019527994 | A | | 10/2019 | |
| JP | 2019530293 | A | | 10/2019 | |
| JP | 2019533380 | A | | 11/2019 | |
| JP | 6642643 | B2 | | 2/2020 | |

OTHER PUBLICATIONS

"Cellular-V2X Technology Overview," Qualcomm, 80-PE732-63 Rev B, 2019.
"Balancing Power and Rate Control for Improved Congestion Control in Cellular V2X Communication Environments," Yeomyung Yoon et al., IEEE Access, vol. 8, Jun. 16, 2020, pp. 105071-105081.
International Search Report regarding International Patent Application No. PCT/JP2020/029320, dated Sep. 29, 2020.
"Improving Information Age in SAE J2945 Congestion-Controlled Beaconing," Sungheon Lim et al., IEEE Communications Letters, vol. 23, No. 2, Feb. 2019.
"C-V2X Congestion Control Study," Qualcomm, 80-PE732-74 Rev. AA, Jun. 24, 2020, pp. 1-97.

* cited by examiner

1

80

| | |
|---|---|
| PDCP | 81 |
| RLC | 83 |
| MAC | 85 |
| PHY | 87 |

FIG.7

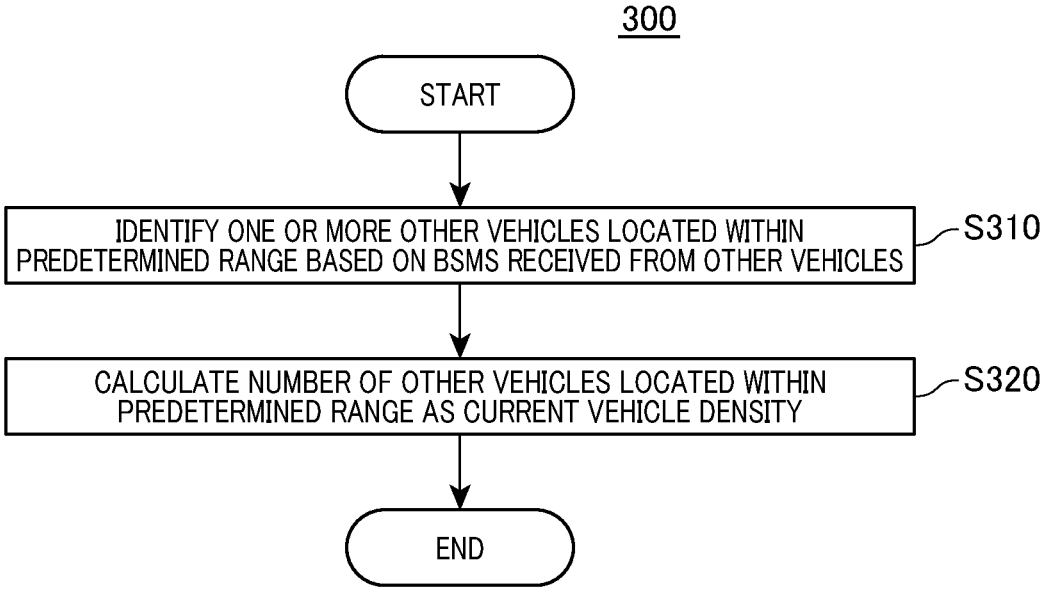

300

START

S310 — IDENTIFY ONE OR MORE OTHER VEHICLES LOCATED WITHIN PREDETERMINED RANGE BASED ON BSMS RECEIVED FROM OTHER VEHICLES

S320 — CALCULATE NUMBER OF OTHER VEHICLES LOCATED WITHIN PREDETERMINED RANGE AS CURRENT VEHICLE DENSITY

END

FIG.8

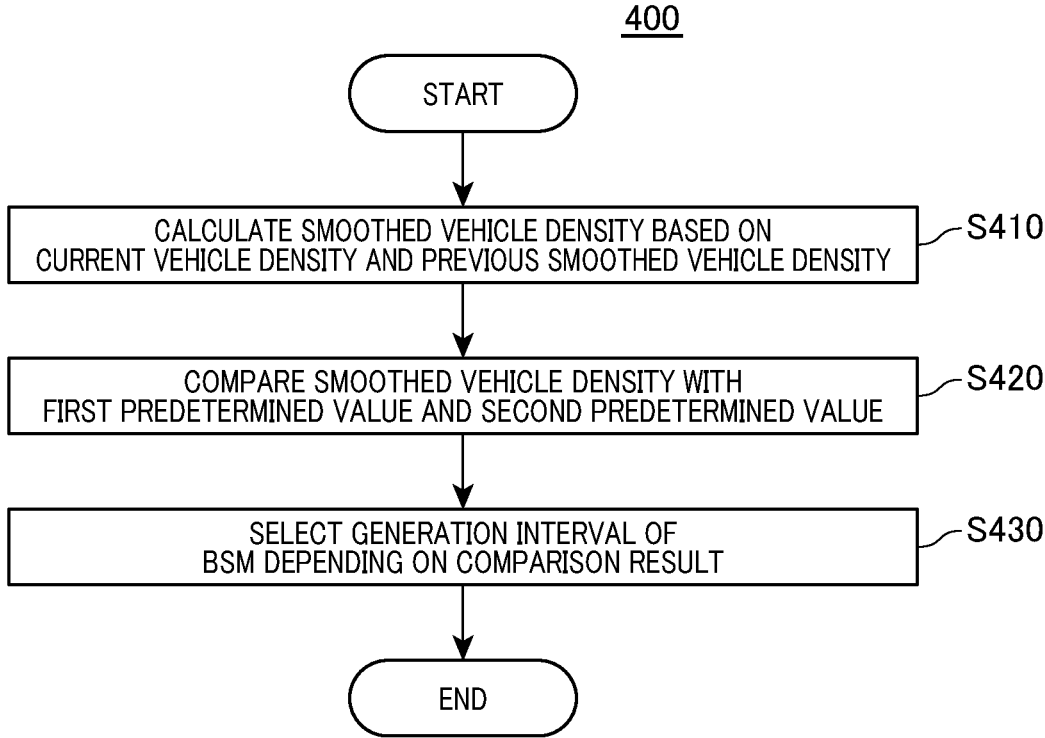

400

START

S410 — CALCULATE SMOOTHED VEHICLE DENSITY BASED ON CURRENT VEHICLE DENSITY AND PREVIOUS SMOOTHED VEHICLE DENSITY

S420 — COMPARE SMOOTHED VEHICLE DENSITY WITH FIRST PREDETERMINED VALUE AND SECOND PREDETERMINED VALUE

S430 — SELECT GENERATION INTERVAL OF BSM DEPENDING ON COMPARISON RESULT

END

Figure 9:
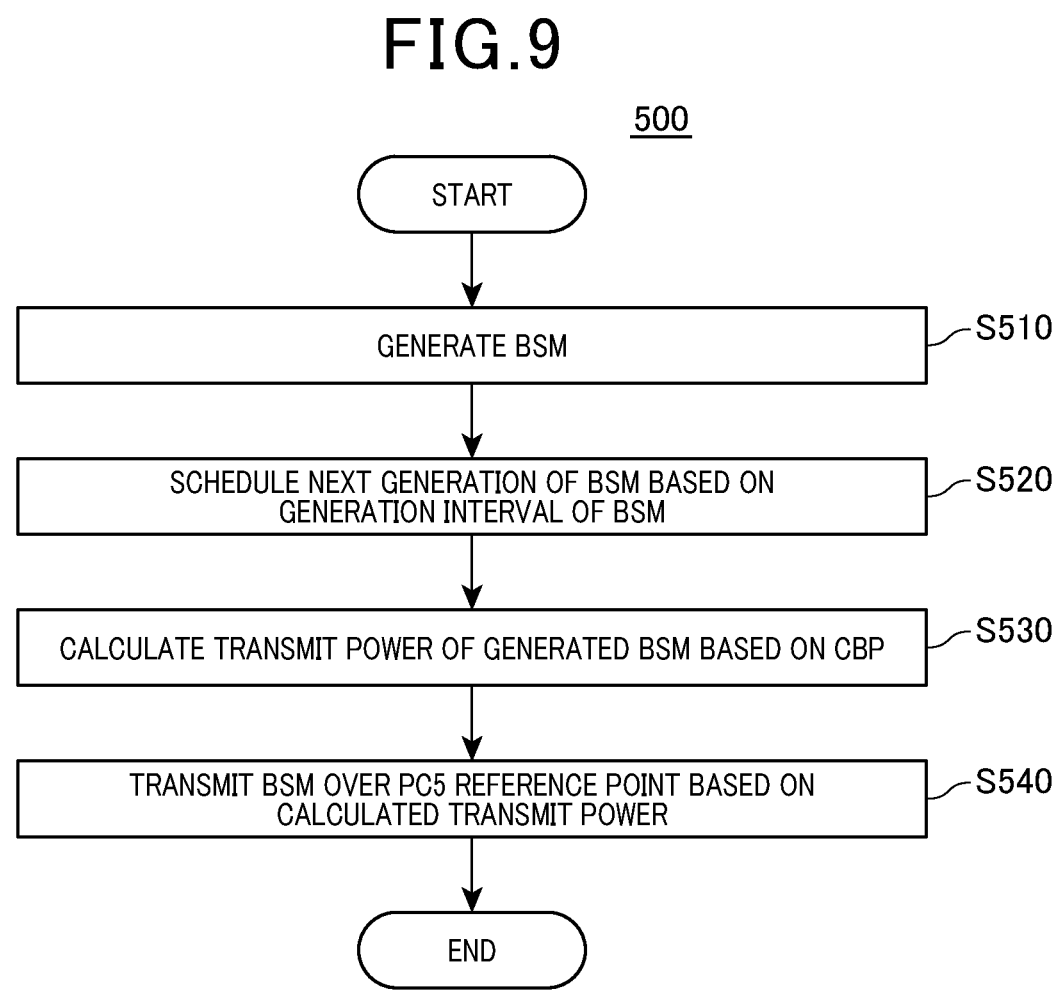

START

GENERATE BSM — S510

SCHEDULE NEXT GENERATION OF BSM BASED ON GENERATION INTERVAL OF BSM — S520

CALCULATE TRANSMIT POWER OF GENERATED BSM BASED ON CBP — S530

TRANSMIT BSM OVER PC5 REFERENCE POINT BASED ON CALCULATED TRANSMIT POWER — S540

END

TRANSITORY TANGIBLE COMPUTER-READABLE STORAGE MEDIUM

CROSS-REFERENCE TO RELATED APPLICATION

The present application is a continuation application of International Application No. PCT/JP2020/29320, filed on Jul. 30, 2020. The contents of this application are incorporated herein by reference in their entirety.

BACKGROUND

1. Technical Field

The present disclosure relates to a method, communication apparatus, and non-transitory tangible computer-readable storage medium for transmitting Basic Safety Messages (BSMs).

2. Related Art

In recent years, mobile communication technologies have been proposed and standardized as technical specifications (TSs) in the 3rd Generation Partnership Project (3GPP). Currently, Long Term Evolution (LTE) technology has matured and 5th Generation (5G) technology is also being studied.

Moreover, Vehicle-to-Everything (V2X) communication using a mobile communication technology has been studied and standardized in 3GPP. Such V2X is referred to as cellular-V2X (C-V2X). Particularly, according to 3GPP TSs, V2X sidelink communication is performed using proximity-based service (ProSe). This allows, for example, direct communication between vehicles.

SUMMARY

A method performed by a communication apparatus according to an aspect of the present disclosure includes calculating a generation interval of a basic safety message used for Vehicle-to-Vehicle, V2V, safety communication based on vehicle density within a predetermined range, and transmitting, based on the generation interval, the basic safety message over a PC5 reference point specified in a technical specification of 3GPP.

A communication apparatus according to an aspect of the present disclosure includes a calculation section configured to calculate a generation interval of a basic safety message used for V2V safety communication, based on vehicle density within a predetermined range, and a communication processing section configured to transmit, based on the generation interval, the basic safety message over a PC5 reference point specified in a technical specification of 3GPP.

A non-transitory tangible computer-readable storage medium according to an aspect of the present disclosure is a non-transitory tangible computer-readable storage medium having stored therein a program for causing a computer to execute operations including calculating a generation interval of a basic safety message used for V2V safety communication, based on vehicle density within a predetermined range, and transmitting, based on the generation interval, the basic safety message over a PC5 reference point specified in a technical specification of 3GPP.

BRIEF DESCRIPTION OF THE DRAWINGS

FIG. 7 is a flowchart for explaining an example of a schematic flow of a current vehicle density calculation process according to an embodiment of the present disclosure.

FIG. 8 is a flowchart for explaining an example of a schematic flow of a generation interval calculation process according to an embodiment of the present disclosure.

FIG. 9 is a flowchart for explaining an example of a schematic flow of a BSM transmission process according to an embodiment of the present disclosure.

DETAILED DESCRIPTION OF THE PREFERRED EMBODIMENTS

Figure 1:
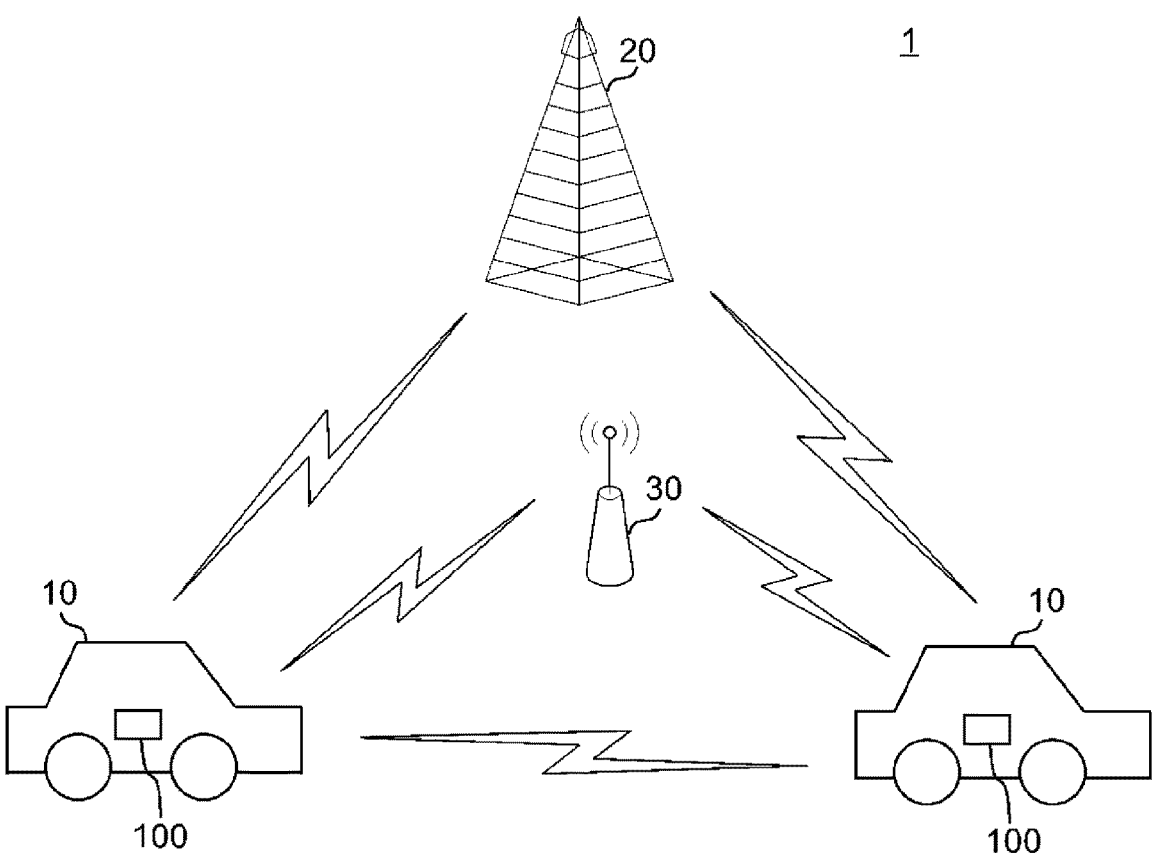
FIG. 1 is an explanatory diagram illustrating an example of a schematic configuration of a communication system according to an embodiment of the present disclosure.

JP 2019-527994 A discloses, for example, a technology for communication between vehicles in which a channel resource occupancy limit is determined based on a Channel Busy Ratio and packets are transmitted based on the channel resource occupancy limit and a priority order of the packets.

According to the technology disclosed in JP 2019-527994 A, congestion can be controlled at an access layer level in direct communication between vehicles. However, a detailed study by the inventors has revealed an issue that an increase in a transmit frequency or transmit power of messages transmitted and received between vehicles using the access layer would result in a possibility that congestion is not sufficiently suppressed even when the congestion control is performed at the access layer. The inventors have also found an issue that, in particular, Basic Safety Messages (BSMs) are transmitted and received between vehicles also in C-V2X from the viewpoint of safety and, as a result, may especially affect congestion in C-V2X.

An object of the present disclosure is to make it possible to suppress congestion caused by BSM transmission in C-V2X.

A method performed by a communication apparatus according to an aspect of the present disclosure includes calculating a generation interval and transmit power of a basic safety message used for Vehicle-to-Vehicle, V2V, safety communication based on a channel busy ratio which is a ratio of time during which a channel is busy and on vehicle density within a predetermined range, and transmitting, based on the generation interval and the transmit power, the basic safety message over a PC5 reference point specified in a technical specification of 3GPP.

A communication apparatus according to an aspect of the present disclosure includes a calculation section configured to calculate a generation interval and transmit power of a basic safety message used for V2V safety communication, based on a channel busy ratio which is a ratio of time during which a channel is busy and on vehicle density within a predetermined range, and a communication processing section configured to transmit, based on the generation interval and the transmit power, the basic safety message over a PC5 reference point specified in a technical specification of 3GPP.

A non-transitory tangible computer-readable storage medium according to an aspect of the present disclosure is a non-transitory tangible computer-readable storage medium having stored therein a program for causing a computer to execute operations including calculating a generation interval and transmit power of a basic safety message used for V2V safety communication, based on a channel busy ratio which is a ratio of time during which a channel is busy and on vehicle density within a predetermined range, and transmitting, based on the generation interval and the transmit power, the basic safety message over a PC5 reference point specified in a technical specification of 3GPP.

This allows, for example, BSMs to be transmitted at an interval and with power appropriate to a surrounding environment, thus suppressing congestion caused by BSM transmission in C-V2X.

Hereinafter, embodiments of the present disclosure will be described in detail with reference to the appended drawings. In the present Specification and the drawings, elements to which similar descriptions are applicable are denoted with the same reference signs, thereby omitting duplicate descriptions.

Descriptions will be given in the following order:
1. Configuration of Communication System
2. Configuration of Communication Apparatus
3. Operations
4. Modification Examples

1. Configuration of Communication System

An example of configuration of a communication system 1 according to an embodiment of the present disclosure will be described with reference to FIGS. 1 to 3. Referring to FIG. 1, the communication system 1 includes vehicles 10, a base station 20, and a road side unit (RSU) 30. In the communication system 1, V2X communication using a mobile communication technology specified in 3GPP TSs is performed.

(1) Vehicle 10 and Communication Apparatus 100

Particularly in this example, a vehicle 10 includes a communication apparatus 100 and uses the communication apparatus 100 to communicate with the base station 20, the RSU 30, or another vehicle 10. In other words, the communication apparatus 100 mounted on a vehicle 10 communicates with the base station 20, the RSU 30, or another vehicle 10. The vehicle 10 may be a four-wheel vehicle (for example, a car, a truck, a bus, or the like) or a two-wheel vehicle (for example, a motorcycle, powered two wheels, or the like).

The communication apparatus 100 is a user equipment (UE) in 3GPP TSs. For example, the communication apparatus 100 is a vehicle-mounted apparatus that can be mounted on a vehicle 10. More specifically, for example, the communication apparatus 100 is an Electronic Control Unit (ECU) for V2X.

(2) Base Station 20

The base station 20 is a node in a radio access network (RAN) and communicates with a UE located within a coverage area of the base station 20. For example, when a vehicle 10 is within this coverage area, the base station 20 communicates with the communication apparatus 100 of the vehicle 10.

For example, the base station 20 is an evolved Node B (eNB) which is an LTE base station. Alternatively, the base station 20 may be a next generation Node B (gNB) which is a 5G base station.

(3) RSU 30

The RSU 30 is installed on a roadside and communicates with communication apparatuses 100 of vehicles 10 located near the RSU 30. For example, the RSU 30 operates as a base station (for example, an eNB or a gNB) in terms of a mobile communication technology. Alternatively, the RSU 30 may operate as a UE in terms of a mobile communication technology.

(4) V2X Communication Using Mobile Communication Technology

The communication apparatus 100 performs V2X communication using the mobile communication technology specified in 3GPP TSs. In other words, the communication apparatus 100 performs V2X communication using radio protocols specified in 3GPP TSs as access layer protocols.

Figure 2:
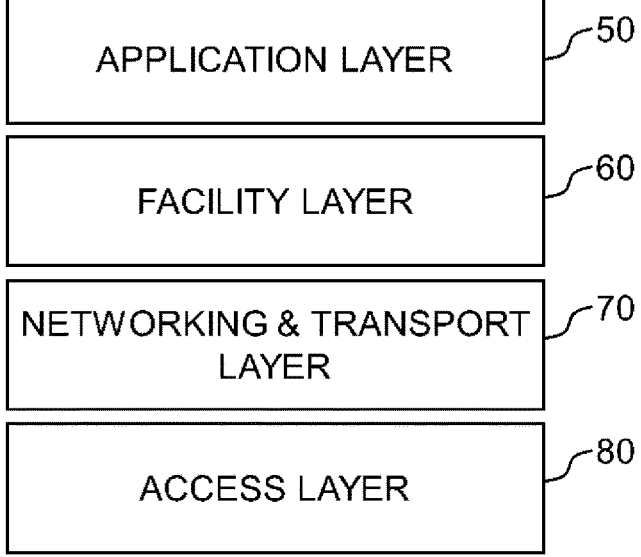
FIG. 2 is an explanatory diagram illustrating an example of layers of V2X communication according to an embodiment of the present disclosure.

Referring to FIG. 2, V2X communication includes, for example, an application layer 50, a facility layer 60, a networking and transport layer 70, and an access layer 80. The communication apparatus 100 performs V2X communication using protocols of the application layer 50, the facility layer 60, the networking and transport layer 70, and the access layer 80. In relation to Layers 1 to 7 of Open Systems Interconnection (OSI) Reference Model, for example, the facility layer 60 corresponds to Layers 5, 6, and 7, the networking and transport layer 70 corresponds to Layers 3 and 4, and the access layer 80 corresponds to Layers 1 and 2.

Figure 3:
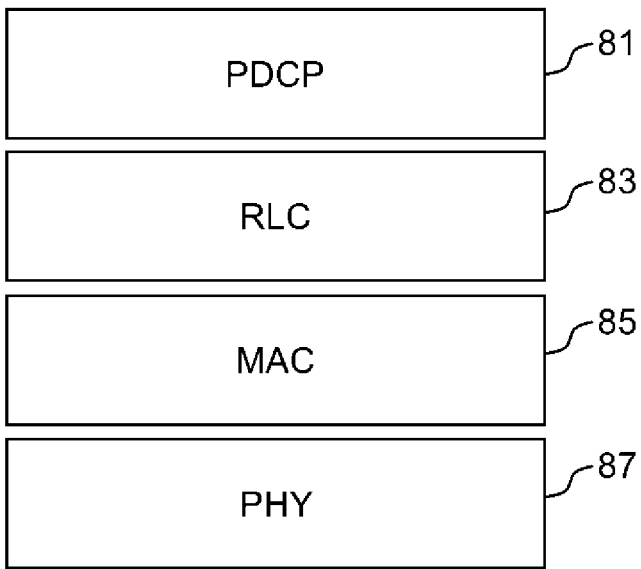
FIG. 3 is an explanatory diagram illustrating an example of protocols included in an access layer of V2X communication according to an embodiment of the present disclosure.

Moreover, referring to FIG. 3, the communication apparatus 100 particularly uses, as protocols of the access layer 80, Packet Data Convergence Protocol (PDCP) 81, Radio Link Control (RLC) 83, Medium Access Control (MAC) 85, and Physical (PHY) 87 specified in 3GPP TSs.

For example, the communication apparatus 100 uses, as protocols at the networking and transport layer 70, Wave Short Message Protocol (WSMP), or User Datagram Protocol (UDP)/Transmission Control Protocol (TCP) and Internet Protocol (IP).

Communication Over PC5 Reference Point

For example, the communication apparatus 100 performs V2X communication with another communication apparatus 100 of another vehicle 10 over a PC5 reference point specified in 3GPP TSs. In other words, the communication apparatus 100 performs V2X communication with another communication apparatus 100 of another vehicle 10 in sidelink specified in 3GPP TSs. Such V2X communication may also be referred to as V2X sidelink communication. Such V2X communication is V2V communication.

Particularly in the present embodiment, the communication apparatus 100 transmits a Basic Safety Message (BSM) used for V2V safety communication over the PC5 reference point. Note that the BSM is a message generated at the facility layer 60.

Communication Over Uu Reference Point

For example, the communication apparatus 100 communicates with the base station 20 over a Uu reference point specified in 3GPP TSs. In other words, the communication apparatus 100 receives signals from the base station 20 in downlink and transmits signals to the base station 20 in uplink. In addition, the communication apparatus 100 may perform V2X communication with a V2X application server via the base station 20. The V2X communication is Vehicle-to-Network (V2N) communication.

2. Configuration of Communication Apparatus

Figure 4:
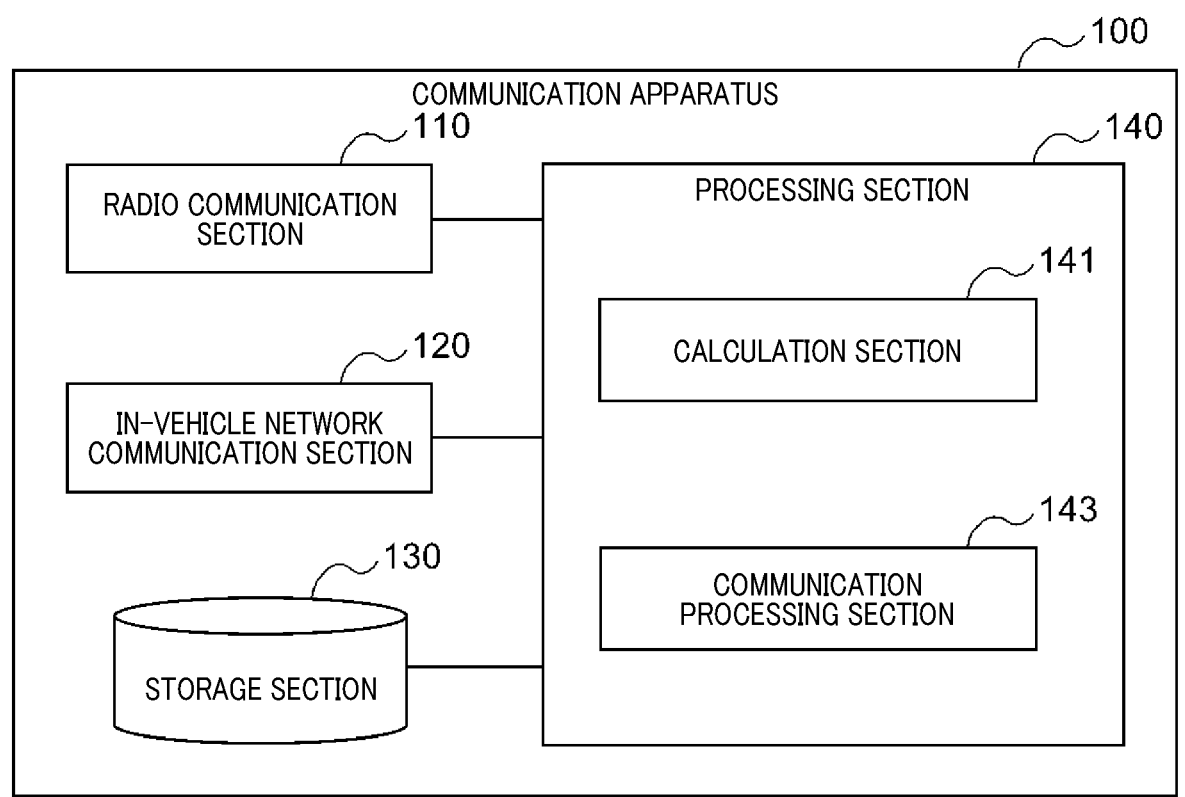
FIG. 4 is a block diagram illustrating an example of a schematic functional configuration of a communication apparatus according to an embodiment of the present disclosure.
Figure 5:
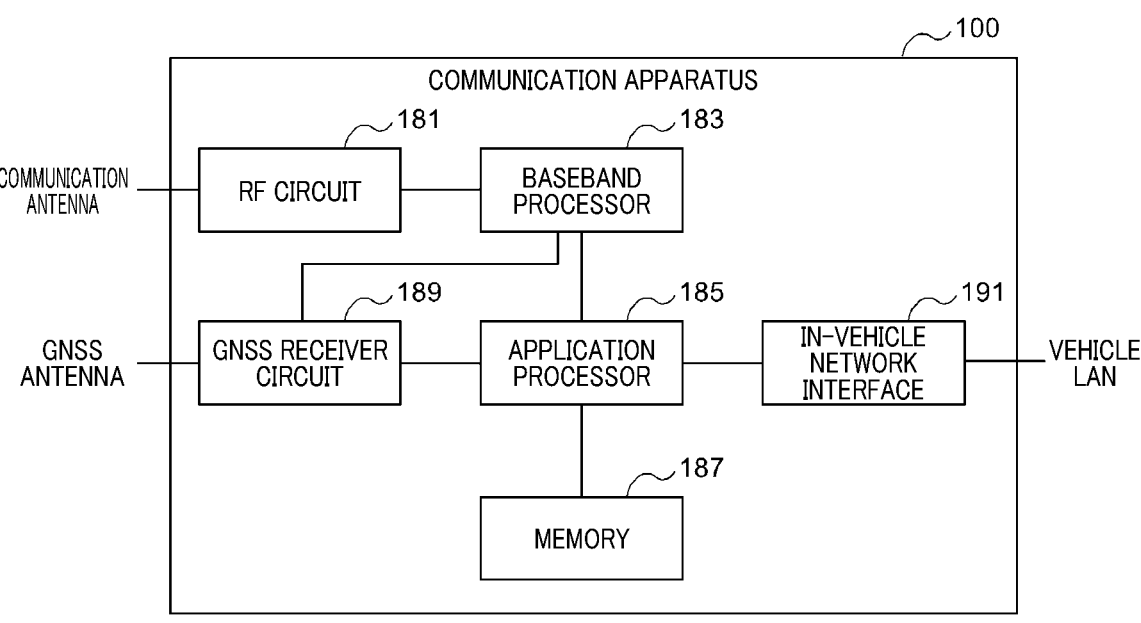
FIG. 5 is a block diagram illustrating an example of a schematic hardware configuration of a communication apparatus according to an embodiment of the present disclosure.

An example of configuration of the communication apparatus 100 according to an embodiment of the present disclosure will be described with reference to FIGS. 4 and 5.

(1) Functional Configuration

First, an example of a functional configuration of the communication apparatus 100 according to an embodiment of the present disclosure will be described with reference to FIG. 4. Referring to FIG. 4, the communication apparatus 100 includes a radio communication section 110, an in-vehicle network communication section 120, a storage section 130, and a processing section 140.

Radio Communication Section 110

The radio communication section 110 wirelessly transmits and receives signals. For example, the radio communication section 110 receives signals from another apparatus and transmits signals to such another apparatus. Such another apparatus is, for example, another communication apparatus 100 of another vehicle 10, the base station 20, or the RSU 30.

In-Vehicle Network Communication Section 120

The in-vehicle network communication section 120 receives signals from a network within the vehicle 10 and transmits signals to the network. For example, the network is a vehicle Local Area Network (LAN). For example, in addition to the communication apparatus 100, various sensors (for example, a driving condition sensor, and the like), various ECUs (for example, an engine control ECU, a driving assistance ECU, and the like), an operation switch, a display device, and the like are connected to the network.

Storage Section 130

The storage section 130 temporarily or permanently stores a program (instructions) and parameters for operations of the communication apparatus 100, as well as various data. The program includes one or more instructions for operation of the communication apparatus 100.

Processing Section 140

The processing section 140 provides various functions of the communication apparatus 100. The processing section 140 includes a calculation section 141 and a communication processing section 143. Note that the processing section 140 may further include a component other than these components. That is, the processing section 140 may perform an operation other than operations of these components. Specific operations of the calculation section 141 and the communication processing section 143 will be described in detail later.

For example, the processing section 140 (specifically, communication processing section 143) communicates with another apparatus via the radio communication section 110. For example, the processing section 140 communicates via the in-vehicle network communication section 120 with another apparatus connected to the network within the vehicle 10.

(2) Hardware Configuration

Next, an example of a hardware configuration of the communication apparatus 100 according to an embodiment of the present disclosure will be described with reference to FIG. 5. Referring to FIG. 5, the communication apparatus 100 includes a Radio Frequency (RF) circuit 181, a baseband processor 183, an application processor 185, a memory 187, a Global Navigation Satellite System (GNSS) receiver circuit 189, and an in-vehicle network interface 191.

For example, the baseband processor 183 performs processing of the protocols at the access layer 80 and communicates with another apparatus via a communication antenna installed on the vehicle 10 and the RF circuit 181. For example, the application processor 185 performs processing of the protocols at the application layer 50, the facility layer 60, and the networking and transport layer 70, and communicates with another apparatus via the communication antenna, the RF circuit 181, and the baseband processor 183.

The memory 187 stores a program executed by the application processor 185, parameters related to the program, and various data. The program may also be referred to as instructions.

The GNSS receiver circuit 189 receives GNSS signals via a GNSS antenna installed on the vehicle 10 and obtains position information, time information, and the like. These pieces of information are provided to the application processor 185. In addition, the time information is also provided to the baseband processor 183 for time synchronization in communication. The time information may be used by the communication apparatus 100 to adjust transmission and reception timings for the time synchronization in communication between the communication apparatus 100 and another apparatus (for example, another communication apparatus 100).

The in-vehicle network interface 191 is, for example, a LAN adapter, and the application processor 185 communicates via the in-vehicle network interface 191 with apparatuses connected to the vehicle LAN.

The radio communication section 110 may be implemented by the RF circuit 181. The in-vehicle network communication section 120 may be implemented by the in-vehicle network interface 191. The storage section 130 may be implemented by the memory 187. The processing section 140 may be implemented by the baseband processor 183 and the application processor 185. In particular, the calculation section 141 may be implemented by the application processor 185, and the communication processing section 143 may be implemented by the baseband processor 183 and the application processor 185.

In view of the hardware configuration described above, for example, the communication apparatus 100 includes a memory that stores a program, and one or more processors that execute the program to perform operations of the calculation section 141 and the communication processing section 143. For example, the memory is the memory 187, and the one or more processors are the application processor 185 and the baseband processor 183. Note that the program can be regarded as a program that causes a computer to execute operations of the calculation section 141 and the communication processing section 143.

3. Operations

An example of operations of the communication apparatus 100 according to an embodiment of the present disclosure will be described with reference to FIGS. 6 to 9.

Particularly according to an embodiment of the present disclosure, the communication apparatus 100 (calculation section 141) calculates a generation interval and transmit power of a BSM used for V2V safety communication, based on a Channel Busy Ratio (CBR) which is a ratio of time during which a channel is busy and on vehicle density within a predetermined range. Moreover, the communication apparatus 100 (communication processing section 143) transmits, based on the generation interval and the transmit power, the BSM over a PC5 reference point specified in 3GPP TSs. Note that the CBR can also be regarded as a ratio of time during which a channel is used.

(1) Calculation of CBR

For example, the communication apparatus 100 (calculation section 141) calculates the CBR. More specifically, for example, the communication apparatus 100 (calculation section 141) calculates the CBR based on duration during which the channel is busy within a measurement interval and on the measurement interval. This leads to, for example, updating the CBR at each measurement interval and, as a result, a fresh CBR can be obtained.

For example, the communication apparatus 100 (calculation section 141) calculates the CBR at each measurement interval.

Measurement Interval

For example, the measurement interval is an interval that is in time synchronization with a subframe used for communication over the PC5 reference point. That is, the start timing of the measurement interval is aligned with the start timing of a certain subframe. This allows, for example, measurement that is compatible with access layer communication.

For example, the measurement interval is equal to an integral multiple of a subframe used for communication over the PC5 reference point. Specifically, for example, the measurement interval is 100 milliseconds (hereinafter, ms) and each subframe is 1 ms. This allows, for example, measurement that is compatible with access layer communication.

For example, the measurement interval is equal to a transmission time interval of a V2X message. Specifically, for example, the transmission time interval is 100 ms. That is, the V2X message can be transmitted at an interval of 100 ms. In this case, the measurement interval is also 100 ms. This allows, for example, using a latest CBR at each transmission of a V2X message.

Duration During which Channel is Busy

For example, the duration during which the channel is busy is measured by carrier sensing and energy detection on the channel. For example, the channel is a channel used for communication over the PC5 reference point. In other words, the channel is a channel used for sidelink communication. More specifically, for example, the channel is a channel within a resource pool used for sidelink communication.

CBR

For example, the CBR is a CBR that is smoothed at each measurement interval. More specifically, for example, the communication apparatus 100 (calculation section 141) calculates a smoothed CBR based on a raw CBR that is calculated for the measurement interval and on a previous smoothed CBR. This prevents a CBR value from fluctuating abruptly, for example, and a more reliable CBR can thus be obtained.

For example, the CBR is a Channel Busy Percentage (CBP) expressed as a percentage.

Calculation Method

An example of a calculation method for the CBR will be described below. In this example, the CBR is a smoothed CBP.

In this example, the measurement interval is denoted by MeasInt, and the duration during which the channel is busy within the measurement interval is denoted by BusyDuration. In addition, the raw CBP that is calculated for the k-th measurement interval is denoted by $CBP_r(k)$, and the CBP that is smoothed based on the raw CBP is denoted by $CBP_s(k)$.

For example, $CBP_r(k)$ is calculated as follows.

$$CBP_r(k) = \frac{BusyDuration \times 100}{MeasInt} \qquad \text{[Math. 1]}$$

Moreover, for example, $CBP_s(k)$ is calculated as follows.

$$CBP_s(k)=CBP_r(k) \times W_{CBP}=CBP_s(k-1) \times (1-W_{CBP}) \qquad \text{[Math. 2]}$$

$W_{CBP}$ is a weight coefficient for smoothing. As an example, $W_{CBP}$ is 0.5.

In this way, $CBP_s(k)$ is updated at each measurement interval.

(2) Calculation of Vehicle Density

For example, the communication apparatus 100 (calculation section 141) calculates the vehicle density.

Vehicle Density

For example, the vehicle density is the number of other vehicles 10 located within a predetermined range.

For example, the vehicle density is vehicle density that is smoothed at each predetermined interval.

Calculation Method

For example, the communication apparatus 100 (calculation section 141) calculates the vehicle density based on one or more BSMs received from one or more other vehicles 10. This allows, for example, calculating the vehicle density without information provision by the network.

More specifically, for example, the communication apparatus 100 (calculation section 141) identifies one or more vehicles located within a predetermined range based on BSMs received from other vehicles 10, and calculates the number of the vehicles located within the predetermined range as current vehicle density. For example, the communication apparatus 100 (calculation section 141) calculates the current vehicle density for a first predetermined interval based on BSMs received during the first predetermined interval. In this way, for example, the communication apparatus 100 (calculation section 141) calculates the current vehicle density at each first predetermined interval.

In addition, the communication apparatus 100 (calculation section 141) calculates smoothed vehicle density based on the current vehicle density and previous smoothed vehicle density at each second predetermined interval. For example, for the k-th second predetermined interval, the current vehicle density is denoted by $VD_c(k)$, and the smoothed vehicle density is denoted by $VD_s(k)$. Then, $VD_s(k)$ is calculated as follows.

$$VD_s(k)=VD_c(k) \times W_{VD}+VD_s(k-1) \times (1-W_{VD}) \qquad \text{[Math. 3]}$$

$W_{VD}$ is a weight coefficient for smoothing.

In this way, $VD_s(k)$ is updated at each second predetermined interval.

Note that, as an example, the first predetermined interval is 1000 ms, the second predetermined interval is 100 ms, and the weight coefficient ($W_{VD}$) is 0.05.

Identification of Vehicle Located within Predetermined Range

For example, the communication apparatus 100 (processing section 140) identifies whether another vehicle 10 is located within the predetermined range, based on position information of the vehicle 10 on which the communication apparatus 100 is mounted, and on position information of the other vehicle 10 included in a BSM received from the other vehicle 10.

As an example, the predetermined range is 100 meters.

(3) Calculation of Generation Interval of BSM

For example, the communication apparatus 100 (calculation section 141) calculates the generation interval of the BSM based on the vehicle density.

Generation Interval

For example, the higher the vehicle density is, the longer the generation interval is. This leads to, for example, generating the BSM at a shorter interval when the vehicle density is low, and generating the BSM at a longer interval when the vehicle density is high. As a result, congestion due to BSM transmission can be suppressed.

For example, the generation interval is equal to an integral multiple of a subframe used for communication over the PC5 reference point. Specifically, for example, a subframe is 1 ms and the generation interval is an integral multiple of 1 ms. This allows, for example, generating the BSM at an interval that is compatible with access layer communication.

Calculation Method

An example of a calculation method for the generation interval will be described below.

$$f(CBP) = \begin{cases} \text{Max\_RP}, & CBP \leq \text{Min\_CU} & \text{[Math. 6]} \\ \text{Max\_RP} - \left(\dfrac{\text{Max\_RP} - \text{Min\_CU}}{\text{Max\_CU} - \text{Min\_CU}}\right) \times (CBP - \text{Min\_CU}), & \text{Min\_CU} < CBP \leq \text{Max\_CU} \\ \text{Min\_RP}, & \text{Max\_CU} \leq CBP \end{cases}$$

$$\text{Base\_RP} = \text{Prev\_RP} + G_{SUPRA} \times (f(CBP) - \text{Prev\_RP}) \qquad \text{[Math. 7]}$$

$$RP = \text{Base\_RP} \qquad \text{[Math. 8]}$$

In this example, the generation interval is calculated at each second predetermined interval like the smoothed vehicle density. Moreover, in this example, for the k-th second predetermined interval, the vehicle density is denoted by $VD_s(k)$, and the generation interval is denoted by $I_{BSM}(k)$.

For example, $I_{BSM}(k)$ is calculated as follows.

[Math. 4]

$$I_{BSM}(k) = \begin{cases} 100, & VD_s(k) \leq B \\ 100 \times \dfrac{VD_s(k)}{B}, & B < VD_s(k) \leq \dfrac{\text{Max\_I}_{BSM}}{100} \times B \\ \text{Max\_I}_{BSM}, & \dfrac{\text{Max\_I}_{BSM}}{100} \times B \leq VD_s(k) \end{cases}$$

B is a coefficient related to the vehicle density, and Max_$I_{BSM}$ is a maximum of the generation interval. As an example, B is 25 and Max_$I_{BSM}$ is 600 ms. In this case, $I_{BSM}(k)$ is 100 ms to 600 ms. In other words, the generation interval of the BSM is 100 ms when the vehicle density is 25 or less, 100 ms to 600 ms when the vehicle density is 25 to 150 or less, and 600 ms when the vehicle density is 150 or more.

Note that the generation interval of the BSM may be referred to as a transmission interval of the BSM.

(4) Calculation of Transmit Power of BSM

For example, the communication apparatus 100 (calculation section 141) calculates the transmit power of the BSM based on the CBR.

Transmit Power

For example, the higher the CBR is, the smaller the transmit power is. This leads to, for example, transmitting the BSM with smaller power when the channel is busy, and transmitting the BSM with greater power when the channel is not busy. As a result, congestion due to BSM transmission can be suppressed.

For example, the transmit power is power with predetermined granularity. Specifically, for example, the predetermined granularity is 1 decibel (hereinafter, dB), and the transmit power is calculated in units of 1 dB. This can suppress, for example, an increase in hardware cost.

Calculation Method

An example of a calculation method for the transmit power of the BSM will be described below.

In this example, the transmit power is denoted by $P_{TX}$ and is calculated as follows.

$$P_{TX} = RP - G + L \qquad \text{[Math. 5]}$$

RP is radiated power for the BSM to be transmitted. G is minimum sector antenna gain, for example, the smaller of an average value of sector antenna gain for a right sector and an average value of sector antenna gain for a left sector. L is total cable and connector loss.

Moreover, RP is calculated as follows.

Max_RP is a higher threshold for the radiated power, and Min_RP is a lower threshold for the radiated power. Max_CU is a higher threshold for channel utilization, and Min_CU is a lower threshold for the channel utilization. $G_{SUPRA}$ is Stateful Utilization-based Power Adaptation (SUPRA) gain. Prev_RP is previous RP. Note that Prev_RP is updated as follows after the calculation of RP.

$$\text{Prev\_RP} = \text{Base\_RP} \qquad \text{[Math. 9]}$$

As an example, Max_RP is 20 decibel milliwatts (hereinafter, dBm), Min_RP is 10 dBm, Max_CU is 80%, Min_CU is 50%, and $G_{SUPRA}$ is 0.5.

Note that, as described later, the communication apparatus 100 (calculation section 141) calculates the transmit power of the BSM when the BSM is transmitted.

(5) BSM Transmission

As described above, the communication apparatus 100 (communication processing section 143) transmits the BSM over the PC5 reference point based on the generation interval and the transmit power.

Scheduling

For example, the communication apparatus 100 (communication processing section 143) schedules next generation of the BSM based on the generation interval. More specifically, for example, the communication apparatus 100 (communication processing section 143) calculates, at the occasion of transmission of the BSM, a next time to generate the BSM by adding the generation interval and a random offset to the time of the transmission.

BSM Generation

For example, the communication apparatus 100 (communication processing section 143) generates the BSM when the current time reaches the next time to generate it.

Information Included in BSM

For example, the BSM includes BSM Part I information. For example, the information contains information on position including latitude, longitude, and elevation, speed, vehicle size, heading, steering wheel angle, acceleration, brake system status, and the like.

In addition, the BSM may include some or all of BSM Part II information. For example, the information contains information on vehicle event flags, path history, path prediction, exterior lights, and the like.

The BSM may include the BSM Part II information less frequently than the BSM Part I information.

Calculation of Transmit Power of BSM

In order to transmit the BSM, the communication apparatus 100 (calculation section 141) calculates the transmit power of the BSM based on the CBR as described above.

BSM Transmission

The communication apparatus 100 (communication processing section 143) transmits the BSM over the PC5 reference point based on the transmit power.

For example, the communication apparatus 100 (communication processing section 143) generates the BSM at the facility layer 60. In addition, the communication apparatus 100 (communication processing section 143) transmits the BSM by processing packets including the BSM at the networking and transport layer 70 and the access layer 80. Particularly, the communication apparatus 100 (communication processing section 143) transmits the packets including the BSM over the PC5 reference point at the access layer 80. In other words, the communication apparatus 100 (communication processing section 143) transmits the packets including the BSM in sidelink at the access layer 80. For sidelink transmission, for example, a sidelink channel is used, and radio resources for sidelink are used.

Transmit power to be actually used is determined at the access layer 80 based on the calculated transmit power. The calculated transmit power may be used as it is as the actual power, or new transmit power recalculated from the calculated transmit power may be used as the actual power.

(6) Process Flow

CBP Calculation Process 200

Figure 6:
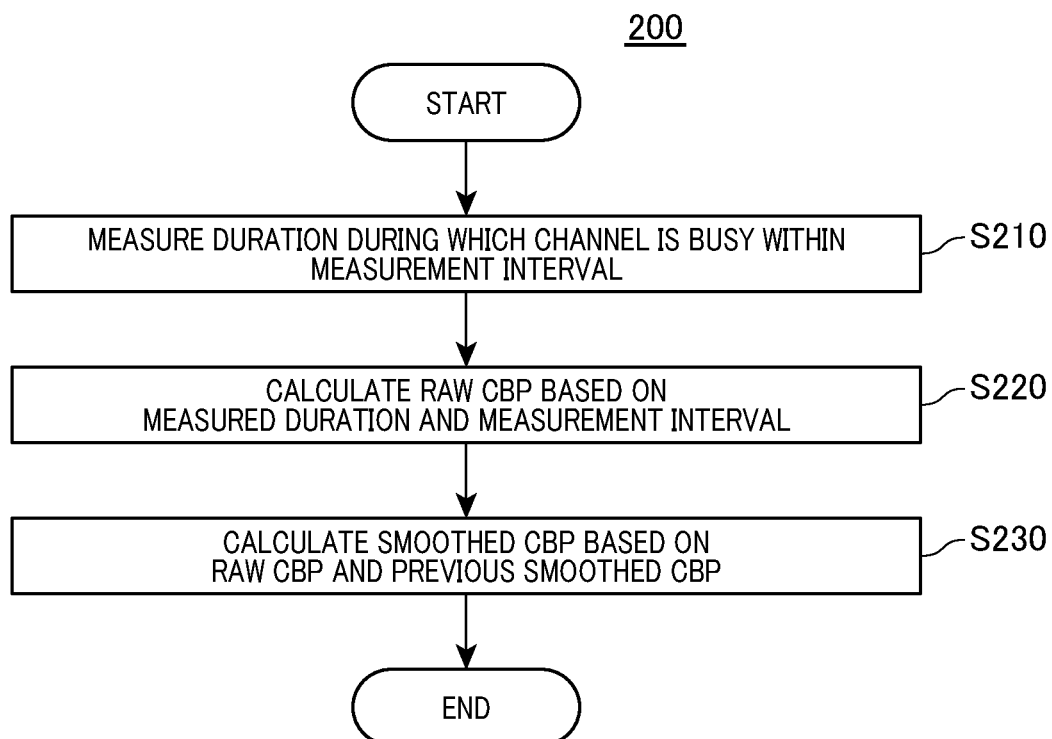
FIG. 6 is a flowchart for explaining an example of a schematic flow of a CBP calculation process according to an embodiment of the present disclosure.

An example of a calculation process 200 for the CBP will be described with reference to FIG. 6. For example, the calculation process 200 is executed at each measurement interval (for example, 100 ms) described above.

The communication apparatus 100 (processing section 140) measures the duration during which the channel is busy within the measurement interval (S210).

The communication apparatus 100 (calculation section 141) calculates a raw CBP based on the measured duration and the measurement interval (S220). For example, the raw CBP is $CBP_r(k)$ described above.

The communication apparatus 100 (calculation section 141) calculates a smoothed CBP based on the raw CBP and a previous smoothed CBP (S230). For example, the smoothed CBP is $CBP_s(k)$ described above.

Current Vehicle Density Calculation Process 300

An example of a calculation process 300 for the current vehicle density will be described with reference to FIG. 7. For example, the calculation process 300 is executed at each first predetermined interval (for example, 1000 ms) described above.

The communication apparatus 100 (calculation section 141) identifies one or more other vehicles 10 located within a predetermined range based on BSMs received from other vehicles 10 (S310).

The communication apparatus 100 (calculation section 141) calculates the number of such other vehicles 10 located within the predetermined range as the current vehicle density (S320). For example, the current vehicle density is $VD_c(k)$ described above.

Generation Interval Calculation Process 400

An example of a calculation process 400 for the generation interval will be described with reference to FIG. 8. For example, the calculation process 400 is executed at each second predetermined interval (for example, 100 ms) described above.

The communication apparatus 100 (calculation section 141) calculates smoothed vehicle density based on the current vehicle density and previous smoothed vehicle density (S410). For example, the smoothed vehicle density is $VD_s(k)$ described above.

The communication apparatus 100 (calculation section 141) compares the smoothed vehicle density with a first predetermined value and a second predetermined value (S420). For example, the first predetermined value is B described above, and the second predetermined value is $Max\_I_{BSM}*B/100$ described above.

The communication apparatus 100 (calculation section 141) selects a generation interval of the BSM depending on the comparison result (S430).

BSM Transmission Process 500

An example of a transmission process 500 for the BSM will be described with reference to FIG. 9. For example, the transmission process 500 is executed when the current time reaches the next time to generate the BSM.

The communication apparatus 100 (communication processing section 143) generates the BSM (S510).

The communication apparatus 100 (communication processing section 143) calculates a next time to generate the BSM based on the generation interval of the BSM (S520).

The communication apparatus 100 (communication processing section 143) calculates the transmit power of the generated BSM based on the CBP (S530).

The communication apparatus 100 (communication processing section 143) transmits the BSM over the PC5 reference point based on the calculated transmit power (S540).

4. Modification Examples (1) Combination with Packet Priority

For example, the above-described operation according to an embodiment of the present disclosure may be combined with a technology of transmitting packets based on a channel resource occupancy limit determined based on the CBR, and on priority of the packets. This may allow transmission of the BSM to be further controlled.

For example, the priority may be ProSe per-packet priority (PPPP). The communication apparatus 100 may control transmission of the BSM based on the channel resource occupancy limit, PPPP of packets of the BSM, and other parameters.

(2) Communication Apparatus 100

In the example described above as an example of an embodiment of the present disclosure, the communication apparatus 100 is vehicle-mounted apparatus that can be mounted on a vehicle 10. However, embodiments of the present disclosure are not limited to this example.

As an example, the communication apparatus 100 may be, instead of a vehicle-mounted apparatus that can be mounted on a vehicle 10, a communication module that can be mounted on the vehicle-mounted apparatus. More specifically, the vehicle-mounted apparatus may be an ECU for V2X, and the communication module may be a communication chip that can be mounted on the ECU.

As another example, the communication apparatus 100 may be a vehicle 10 itself instead of a vehicle-mounted apparatus that can be mounted on a vehicle 10. In this case, the communication apparatus 100 may further include a communication antenna, a GNSS antenna, a vehicle LAN, various sensors, various ECUs, an operation switch, a display device, and the like.

While an embodiment of the present disclosure has been described above, the present disclosure is not limited to the embodiment. It will be understood by those skilled in the art that the embodiment is merely an example and various changes can be made without departing from the scope and the spirit of the present disclosure.

For example, steps in a process described in the present Specification do not necessarily have to be executed chronologically in the order described in the flowchart. For example, steps in a process may be executed in an order different from the order described as the flowchart, or may be executed in parallel. In addition, some of steps in a process may be removed, or a further step may be added to a process.

For example, there may be provided a method including the operations of the components (for example, the calculation section and the communication processing section) of the communication apparatus described in the present Specification, or a program for causing a processor to execute the operations of the components. Moreover, there may be provided a non-transitory tangible computer-readable storage medium having stored therein the program. Naturally, such a method, program, and non-transitory tangible computer-readable storage medium are also included in the present disclosure.

What is claimed is:

1. A method performed by a communication apparatus of a vehicle, comprising:

calculating a k-th smoothed vehicle density from a k-th vehicle density within a predetermined range, a weight coefficient for smoothing, and a k–1-th smoothed vehicle density;

calculating a generation interval of a basic safety message used for Vehicle-to-Vehicle (V2V) safety communication, based on the k-th smoothed vehicle density; and transmitting, based on the generation interval, a channel busy ratio, a priority of a packet and an occupancy limit of channel resources, the basic safety message to another communication apparatus of another vehicle over a PC5 reference point specified in a technical specification of the 3rd Generation Partnership Project, 3GPP (3GPP);

wherein the generation interval is equal to an integral multiple of a subframe used for communication over the PC5 reference point.

2. The method according to claim 1, wherein the occupancy limit is determined based on the channel busy ratio.

3. The method according to claim 1, wherein the priority is a ProSe per-packet priority (PPPP).

4. The method according to claim 1, wherein the generation interval is calculated using the vehicle density, a coefficient related to the vehicle density, and a maximum of the generation interval.

5. The method according to claim 4, wherein the coefficient related to the vehicle density is 25, and the generation interval ranges from 100 to 600 milliseconds.

6. The method according to claim 1, further comprising calculating the vehicle density based on one or more basic safety messages received from one or more vehicles.

7. The method according to claim 1, wherein the higher the vehicle density is, the longer the generation interval is.

8. The method according to claim 1, wherein the generation interval is 100 milliseconds when the vehicle density is 25 or less.

9. The method according to claim 1, further comprising adjusting transmission timings for time synchronization using time information obtained by reception of Global Navigation Satellite System, GNSS, signals.

10. The method according to claim 1, wherein the communication apparatus is one of a vehicle-mounted apparatus mounted on the vehicle, a communication module that can be mounted on the vehicle-mounted apparatus, or the vehicle.

11. A communication apparatus of a vehicle comprising:

a memory storing a program; and one or more processors configured to execute the program to:

calculate a k-th smoothed vehicle density from a k-th vehicle density within a predetermined range, a weight coefficient for smoothing, and k–1-th smoothed vehicle density;

calculate a generation interval of a basic safety message used for Vehicle-to-Vehicle (V2V) safety communication, based on the k-th smoothed vehicle density; and transmit, based on the generation interval, a channel busy ratio, a priority of a packet and an occupancy limit of channel resources, the basic safety message to another communication apparatus of another vehicle over a PC5 reference point specified in a technical specification of the 3rd Generation Partnership Project (3GPP);

wherein the generation interval is equal to an integral multiple of a subframe used for communication over the PC5 reference point.

12. A non-transitory tangible computer-readable storage medium having stored therein a program for causing a computer to execute operations comprising:

calculating a k-th smoothed vehicle density from a k-th vehicle density within a predetermined range, a weight coefficient for smoothing, and a k–1-th smoothed vehicle density;

calculating a generation interval of a basic safety message used for Vehicle-to-Vehicle (V2V) safety communication, based on the k-th smoothed vehicle density; and transmitting, based on the generation interval, a channel busy ratio, a priority of a packet and an occupancy limit of channel resources, the basic safety message to another communication apparatus of another vehicle over a PC5 reference point specified in a technical specification of the 3rd Generation Partnership Project (3GPP);

wherein the generation interval is equal to an integral multiple of a subframe used for communication over the PC5 reference point.

* * * * *